(12) United States Patent
Ferryman et al.

(10) Patent No.: US 8,882,050 B2
(45) Date of Patent: Nov. 11, 2014

(54) RAILWAY TRACK AND SWITCH WEATHER PROTECTION BARRIER SYSTEM

(75) Inventors: Roger Ferryman, Moseley, VA (US); Paul R. Dubay, Chesterfield, VA (US)

(73) Assignee: Sealeze, A Unit of Jason Inc., Richmond, VA (US)

( * ) Notice: Subject to any disclaimer, the term of this patent is extended or adjusted under 35 U.S.C. 154(b) by 336 days.

(21) Appl. No.: 13/089,525

(22) Filed: Apr. 19, 2011

(65) Prior Publication Data

US 2011/0253844 A1    Oct. 20, 2011

Related U.S. Application Data

(60) Provisional application No. 61/326,012, filed on Apr. 20, 2010.

(51) Int. Cl.
*E01B 19/00* (2006.01)
*E01B 7/20* (2006.01)

(52) U.S. Cl.
CPC .. *E01B 7/20* (2013.01); *E01B 19/00* (2013.01)
USPC ........................................................ 246/428

(58) Field of Classification Search
USPC ........................................................ 246/428
See application file for complete search history.

(56) References Cited

U.S. PATENT DOCUMENTS

| | | |
|---|---|---|
| 834,327 A | 10/1906 | Shaw |
| 997,174 A | 7/1911 | Baldwin |
| 1,661,040 A | 2/1928 | Gervasio |
| 3,233,097 A | 2/1966 | Watkins |
| 3,312,820 A | 4/1967 | Watkins |
| 3,536,909 A | 10/1970 | Czyl |
| 3,972,497 A | 8/1976 | Ringer |
| 3,974,993 A | 8/1976 | Hammecke |
| 4,671,475 A | 6/1987 | Widmer |
| 4,695,017 A | 9/1987 | Ringer et al. |
| 5,018,690 A | 5/1991 | Widmer |
| 5,824,997 A | 10/1998 | Reichle et al. |
| 6,065,721 A | 5/2000 | Sumpton et al. |
| 6,571,963 B2 | 6/2003 | Humphrey et al. |

FOREIGN PATENT DOCUMENTS

| | | |
|---|---|---|
| JP | 2001279635 | 10/2001 |
| JP | 2001295203 | 10/2001 |
| JP | 2009019367 | 1/2009 |
| WO | 2005103384 | 11/2005 |

*Primary Examiner* — Zachary Kuhfuss
(74) *Attorney, Agent, or Firm* — Boyle Fredrickson S.C.

(57) ABSTRACT

A railway track barrier system that includes a barrier extending along a rail adjacent a switch having an upper edge adjacent a rail head disposed within a wash zone thereof formed of deflector elements movable relative to one another permitting railway vehicle wheel and wash contact during train passage without barrier dislodgement or damage. The barrier is formed of a deflector acutely inclined toward the head and a downwardly extending skirt that conforms to uneven railway bed and tie surfaces. A preferred barrier is formed of oppositely extending brushes removably attached to a mounting bracket. The bracket can be attached to a hinge assembly that releasably latches the barrier in an operating position and that can be unlatched permitting the barrier to be swung away from the rail to an inspection position. A hinge pin with a manually graspable handle can be removed to detach the barrier for storage.

37 Claims, 5 Drawing Sheets

RAILWAY TRACK AND SWITCH WEATHER PROTECTION BARRIER SYSTEM

CROSS-REFERENCE TO RELATED APPLICATION

This application claims the benefit of priority from U.S. Provisional Patent Application Ser. No. 61/326,012 filed on Apr. 20, 2010 and entitled Railway Track and Switch Weather Protection Brush Assembly, the entirety of which is hereby incorporated by express reference thereto.

FIELD OF THE INVENTION

The present invention relates to an assembly for providing a weather barrier alongside the rails of a railway track and more particularly to a barrier system that helps protect rails and switch clearing systems adjacent the rails in the vicinity of a switch or turnout.

BACKGROUND

Track switches or turnouts are found at various locations along railroad or railway tracks that typically include one or more switching rails that are movable relative to fixed track rails between one position that allows a train or cars of the train to continue traveling along the same set of tracks or another position that switches the train or cars of the train to another set of tracks. Since they are automatically or remotely activated, it is very important to keep them free and clear of any obstructions, including ice and snow, which could interfere with their operation. Switch clearing systems are commonly employed to prevent the buildup of snow and ice along track switches so they remain operable. Proper switch clearing system operation is therefore critical to ensure ice and snow accumulation does not interfere with the ability of each switching rail to be moved when the switch or turnout is activated.

Switch clearing systems come in many forms, including those which use fluid, e.g., heated air, as well as electrical heating elements to clear away snow and ice so it does not interfere with switch operation. One commonly used type of switch clearing system is disclosed in U.S. Pat. Nos. 3,972, 497; 4,695,017; and 6,065,721, which directs air through ductwork, tubes and/or shrouds out nozzles or other orifices directing streams or curtains of air at relatively high velocity toward the rails of a switch to help keep them clear. These and other lower velocity systems can employ burners or heaters, such as those that use a combustible fuel, such as natural gas, propane, or the like, to heat up the air before it is discharged against the rails in the vicinity of the switch.

Another commonly used type of switch clearing system employs a switch or rail heater of the type taught by U.S. Pat. Nos. 3,974,993 and 5,824,997, which uses one or more heating elements that can be electrically powered to heat up or defrost rails, including switching rails, and other components of a switch to help keep them free of snow and ice. With rail heaters, one or more heating elements typically are in direct contact with a corresponding rail to melt snow and ice accumulation and prevent buildup of snow and ice.

While switch clearing systems are in widespread use, they are not foolproof. Since they use so much energy when operating, they typically utilize a control system that interfaces with one or more sensors, such as capacitive sensors, temperature sensors, precipitation gauges, and the like, to control when they operate. There are times however, when the control system can malfunction, such as when a precipitation gauge malfunctions during periods of high winds or excessive precipitation accumulation. There are times when weather conditions are so extreme that snow and ice buildup despite switch clearing system operation.

It has long been known to supplement them with barrier systems, such as disclosed in U.S. Pat. Nos. 4,671,475; 5,018, 690 and 6,571,963, which work in concert with switch clearing systems to increase their effectiveness. Such barrier systems typically utilize tarpaulin, waterproofed canvas, wooden boards, and fiberglass covers adjacent part of the switch clearing system to not only help provide shielding but also to attempt to reduce heat loss.

Unfortunately, these conventional barrier systems possess many drawbacks. Since their barriers are of solid, imperforate or hard shell construction, they cannot be placed too close to the top or head of any rail to avoid directly contacting part of a train or rail maintenance vehicle traveling on the rails, which can significantly limit their effectiveness. For example, road-rail maintenance trucks capable of legal use on road and railway tracks, also known as "highrailers" or hi-rail trucks, have flanged metal wheels that lower onto the rails to guide the truck whose tires ride directly on the rails. Many of these trucks have dually rear tires with the outer tire hanging down alongside the outer rail. The tires of such a rail maintenance vehicle can come into contact with barriers as the vehicle travels along the rails, which can dislodge or even damage them. The same can occur with chained together semi-trailers riding on bogies or wheelsets in a "roadrailer" configuration being pulled by a locomotive that have tires that hang downwardly very close to the rails, as this also limits how high and how close to the rails that conventional barriers can be located.

In addition, high winds combined with the repeated cycling caused by the wash from trains passing through also can dislodge and even damage such barriers, which not only can adversely impact switch clearing system operation, it can also undesirably result in a dislodged or damaged barrier coming into contact with part of the train at some point further damaging or even destroying them. To prevent these things from happening, conventional barriers are spaced far enough from the top or head of the rail so that directed contact is avoided and so the impact on them from train wash is negligible. Unfortunately, the large spacing that must be provided results in considerable heat produced by rail heater operation being lost dramatically reducing the effectiveness of these types of switch clearing systems, particularly in severe or extreme weather conditions.

Conventional barrier systems suffer from other drawbacks as well. Despite being so far away from the top of any rail that rail heater heat loss cannot be prevented, such barriers are usually still located close enough to hinder track inspection and repair. Where inspection or repair is required, removal is undesirably time consuming and labor intensive. In some instances, their use is seasonal requiring them to be removed and typically stored in large, space consuming racks. Accordingly, it has been found that locations utilizing these types of barrier systems have relatively high operating and maintenance costs.

One type of system that has been developed that seeks to overcome at least some of these drawbacks is a vertical brush strip arrangement disclosed in WO/2005/103384. While the vertical brush strip arrangement disclosed in WO '384 has enjoyed considerable commercial success in Europe, improvements nonetheless remain desirable. Though conducive for rail inspection, its perpendicular vertical orientation and large distance from the adjacent rail allows snow and ice accumulation to occur between the brush strip and rail limiting its functionality as a barrier system. In addition to the large gap between the brush strip and rail allowing falling snow to accumulate, the gap also allows wind flowing generally perpendicular to the rails, particularly at relatively low velocities, to blow snow over the brush strip into the gap between the brush and rail which also can cause accumulation to occur. Finally, the spacing is so great from the rail that the brush strip does nothing to prevent heat loss during rail heater operation.

It therefore would be desirable to provide a barrier system for railway tracks which better protects areas along the railway tracks where switch clearing systems are located and which does not suffer from the foregoing described disadvantages.

SUMMARY OF THE INVENTION

The present invention is directed to a barrier system for railroad and railway tracks used to help keep precipitation, including snow and ice, away from one or more track rails in the vicinity of a switch or turnout. The barrier system includes a barrier having an upper edge with deflecting elements movable relative one another located adjacent a head of a track rail within a wash zone of flowing air created by a train traveling along the tracks along the barrier. The upper barrier edge is part of a deflector inclined toward the adjacent rail that deflects wind and precipitation away from the rail helping to prevent snow and ice accumulation between the barrier and adjacent rail while also helping reduce heat loss where a portion of a switch clearing system, such as ductwork and/or a heating element, is located between the barrier and adjacent rail. Inclining the deflector toward the rail allows its upper edge to be positioned very closely to the rail while minimizing the amount of direct contact with any railway vehicle wheel and any high-railer or road-railer tire. The barrier includes a skirt that can be part of the deflector that extends downwardly conforming to the contour of the underlying railway bed and ties or sleepers supported by the bed.

In one preferred barrier, the upper deflector edge is formed of at least a plurality of pairs of flexible deflecting elements that are relatively movable relative to one another with the deflecting elements forming an upwardly extending deflector that is inclined toward the adjacent rail with the upper edge located adjacent the head of the rail. The deflector is configured and positioned so its upper edge is disposed at a height higher than a bottom of the rail head with the upper edge located close enough to the rail head that the upper edge also vertically overlies part of a bottom base of the rail that is supported by one or more underlying ties or sleepers as well as the railway bed. In one preferred embodiment, the deflector is configured so the upper edge is located at a height higher than an upper running surface of the rail head on which railway vehicle wheels ride. The upper edge can be located close enough to the upper running surface of the rail head that parts of the upper edge can come into contact with railway vehicle wheels riding on the rails and can also come into contact with tires of high-rail vehicles and road-railers.

In one preferred embodiment, the upper deflector edge is located adjacent a bottom corner of a railway vehicle wheel riding on the head of the rail within a wash zone extending outwardly of the wheel that can extend as far as an inch and a half (about thirty eight millimeters) from the wheels of a train riding on the rail with the outward extent of the wash zone varying depending on the speed of the railway cars, the shape of the cars, and the like. The upper deflector edge can be located close to the rail head so as to make contact with railway vehicle wheels riding on the rail with the relatively movable flexible deflecting elements being movable away from the wheels when contacted by wheels as well as by wash created in the wash zone thereby preventing barrier dislodgment and minimizing barrier damage during train passage.

The deflector is inclined at an acute angle relative to an underlying tie or portion of the railway bed toward the head of the adjacent rail causing precipitation, including rain, falling on the deflector to slide, roll or flow down the deflector away from the adjacent rail. By the deflector being inclined toward the rail head, having an upper edge at a height at least as high as the bottom of the rail head, and having the upper edge located adjacent the rail head within the wash zone, wind, along with falling precipitation, is deflected upwardly away and over the adjacent rail. This not only helps prevent precipitation, such as in the form of snow and ice, from accumulating between the barrier and adjacent rail, it also helps reduce heat loss in this same region. Where the upper edge of the deflector is disposed at a height higher than the running surface of the rail head, wind and precipitation carried by the wind are deflected even higher over the adjacent rail.

The skirt is extends downwardly along the bottom of the barrier and is configured to conform to uneven surfaces along the underlying ties, railway bed, and depressions in the railway bed between adjacent ties, thereby preventing snow and precipitation from getting between the barrier and adjacent rail. The skirt can extend generally downwardly and can be inclined at an angle different than that of the deflector. While the skirt and deflector can be of unitary construction, the skirt and deflector are separate portions of the barrier in at least one barrier embodiment.

In one preferred barrier embodiment, the deflector is formed of an upper brush with its relatively movable deflector elements formed of flexible bristles of the brush and the skirt is formed of a lower brush with its flexible bristles enabling the skirt to conform to the uneven surface created by the railway bed and ties. The upper brush is uprightly inclined toward the adjacent rail with its bristle tips forming the upper edge of the deflector. The lower brush extends generally downwardly and can be oriented at the same or a similar angle as the upper brush. The brushes adjoin or overlap so as to form a continuous and uninterrupted barrier.

In a preferred embodiment, the bristles of the brushes are non-metallic and the brushes themselves can be completely made of non-metallic material that preferably is electrically insulating. In one preferred embodiment, the bristles of the upper brush are made of polyester and the bristles of the lower brush are made of polypropylene as these bristle materials are water repellent preventing water from passing between the bristles and getting in between the brushes and the adjacent rail. If desired, the bristles of both brushes can be made of polypropylene.

The brushes are held by clamp plates in a generally oppositely extending configuration with the clamp plates removably attached by removable fasteners to a mount of a bracket of a mounting assembly used to mount the brushes so at least the upper brush or deflector is positioned with its upper edge a desired distance away from the head of the adjacent rail and so it is inclined acutely relative to an underlying tie or portion of the railway bed. The clamp plates also hold the lower brush or skirt so it extends downwardly making contact with underlying ties and those portions of the railway bed disposed between the ties. Each clamp plate is generally L-shaped with the fasteners extending through bristles of both brushes adjacent a spine of each brush thereby securing them in place in a manner that prevents them from being pulled free of the clamp plates.

The mount is part of a mounting bracket having an elongate mounting arm disposed at an angle or bend relative to the mount with the arm in turn attached to a foot disposed at another angle or bend relative thereto. In a preferred embodiment, the mount, arm and foot of the mounting bracket is made of a single piece of material, such as metal, plastic or composite material that has a width typically no wider than an underlying tie to which the bracket is attached. Where it is desired to prevent electricity, e.g., static electricity, buildup and/or transmission, the mounting bracket, brush bristles, and/or brush spine can be made of an electrically insulating material.

The foot of the mounting bracket can be directly fixed to an underlying tie using a plurality of fasteners, each of which can be lag bolts where the underlying tie is made of wood. Where the tie is made of concrete, plastic, a composite or another type of material, other types of fasteners can be used that can be adhesively anchored to the tie or secured using a fastener anchor disposed in a bore in the tie. In a preferred embodiment, the fasteners extend through a pad between the foot of the mounting bracket and the tie with the pad serving as a spacer. The pad can be configured to help dampen or isolate barrier vibration and/or oscillation during operation. Such a pad can be made of plastic and can be of elastomeric construction.

In a preferred embodiment, the pad spaces the foot of the mounting bracket above a tie plate or brace used to secure part of the rail overlying the tie to the tie. The pad and/or foot of the mounting bracket can be attached to the underlying tie at the end of the tie plate or brace with the end of the tie plate or brace serving to locate the mounting location for each mounting bracket to a respective underlying tie that locates the barrier relative to an adjacent part of the rail substantially uniformly spacing its upper deflector edge relative to the rail.

The mounting bracket can also be attached to the underlying tie in a manner that permits the barrier to be swung away from the adjacent rail for inspection and repair of the rail. In one preferred embodiment, the foot of the mounting bracket is carried by or part of a hinge assembly used to pivotally mount the barrier. The hinge assembly includes a hinge plate that can be part of or carry the foot with the hinge plate attached by a hinge to an anchor plate that is fixed to the underlying tie. The hinge assembly allows the barrier to be pivoted about the hinge between a generally upright operating position where it is adjacent and inclined toward the rail at the desired spacing relative to the rail and an inspection position where the barrier is pivoted away from the rail exposing the rail in a manner that provides visual and physical access.

A latch assembly is employed to releasably retain the barrier in the operating position and is unlatched to enable the barrier to be swung away from the adjacent rail to an inspection position. A preferred latch assembly includes an anchor on one side of the hinge assembly, a hook on the other side of the hinge assembly, and a latch arm pivotally connected to the anchor that releasably engages the hook when latched such that the latch arm overlies the foot of the bracket arm and/or hinge plate of the hinge assembly thereby keeping the hinge plate overlapped with the anchor plate maintain the barrier in the operating position. When the latch arm is disengaged from the hook, the foot and hinge plate can be pivoted about the hinge to swing the barrier away from the rail to an inspection position permitting inspection and access thereto. When desired to return the barrier to the operating position, the barrier is swung back to the operating position and the latch arm is re-engaged with the hook. The latch arm can carry a dampener, such as in the form of one or more elastomeric O-rings or the like, which abut against the foot of the mounting bracket when the barrier is latched in the operating position. The dampener helps dampen and isolate vibration and oscillation of the barrier and mounting bracket during barrier operation.

The hinge assembly can be configured to enable disengagement from the underlying tie, such as to permit removal of the barrier, such as where it is desired to remove and store the barrier when not needed. Where configured to permit disengagement and removal, a hinge pin received in knuckles of the hinge has a handle that is manually grasped and pulled to pull the pin free of the knuckles. In preparation for removal, the latch is released and the barrier swung away from the adjacent rail to an inspection position before the hinge pin is removed.

Various other features, advantages and objects of the present invention will be made apparent from the following detailed description and the drawings.

BRIEF DESCRIPTION OF THE DRAWINGS

Preferred exemplary embodiments of the invention are illustrated in the accompanying drawings in which like reference numerals represent like parts throughout and in which:

FIG. 5 is a fragmentary side elevation view of another preferred mounting assembly that is a fixed mounting assembly;

FIG. 6 is a fragmentary cross-sectional view of the fixed mounting assembly of FIG. 5.

DETAILED DESCRIPTION

Figure 1:
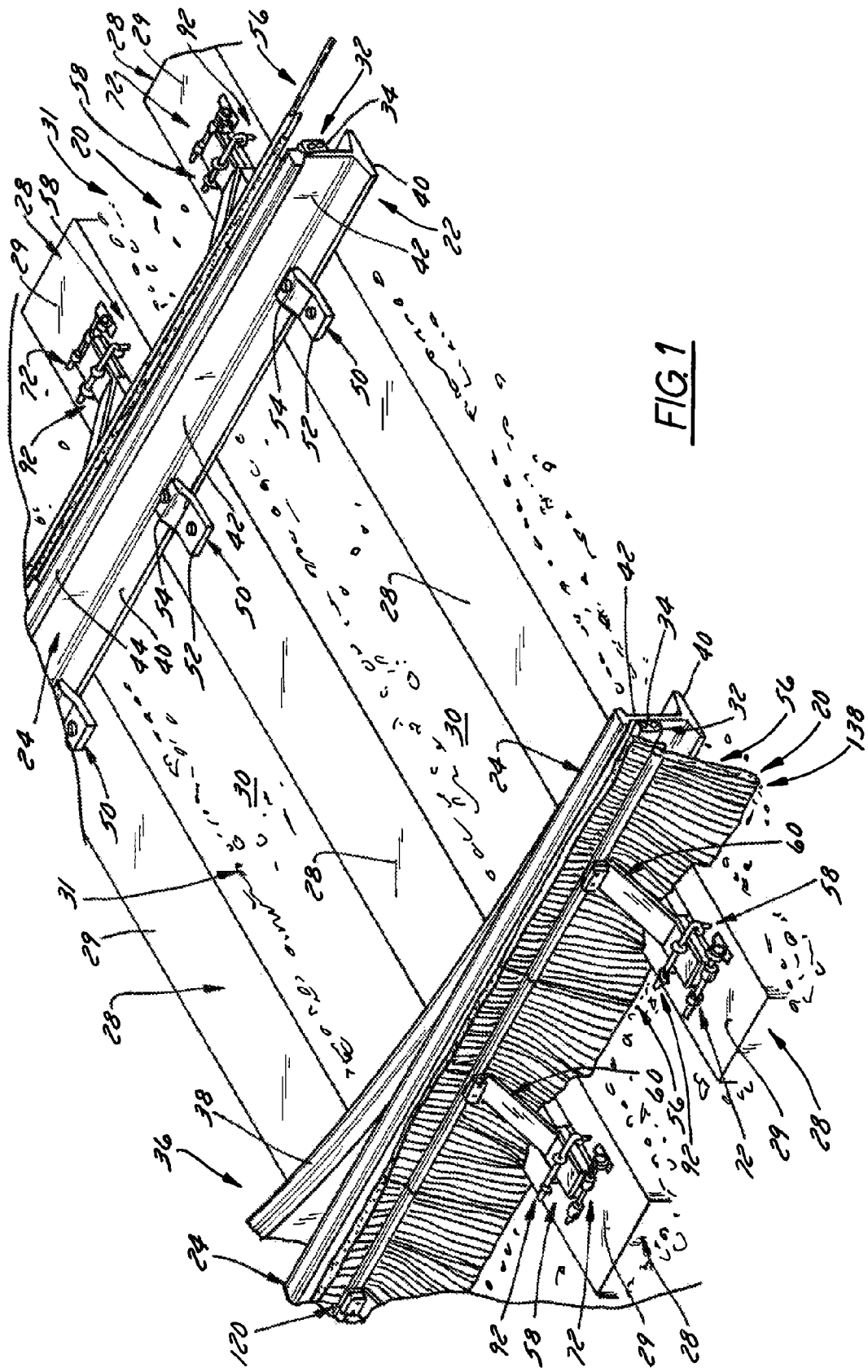
FIG. 1 is a perspective view of a set of railroad or railway tracks adjacent a switch having a railway track and switch weather protection barrier system according to the present invention mounted adjacent thereto.

Referring now to the drawings, and initially to FIG. 1, a pair of weather protecting barrier systems 20 for use with railroad tracks 22 according to the present invention is illustrated with each barrier system 20 extending alongside a corresponding rail 24 of a set of railroad or railway tracks 22 supported on transversely extending railroad ties or sleepers 28 carried by a bed 30 of gravel or rock. Each barrier system 20 typically is located alongside a switch clearing system 32, such as one employing a switch or rail heater 34, used to help keep a switch or turnout 36 operable in cold weather. Such a switch or turnout 36 typically includes one or more switch rails 38 movable relative to a set of fixed rails 24 enabling a train or railway cars of a train to be switched from one set of tracks to another set of tracks. While the switch clearing system 32 shown in FIG. 1 employs a switch or rail heater 34 attached to each rail 24 between the barrier system 20 and adjacent rail 24 in the vicinity of the switch 36, the barrier system 20 can be used with other types of switch clearing systems, including those that employ fluid-conveying ductwork, tubing or the like disposed between a rail 24 and barrier system 20.

Figure 2:
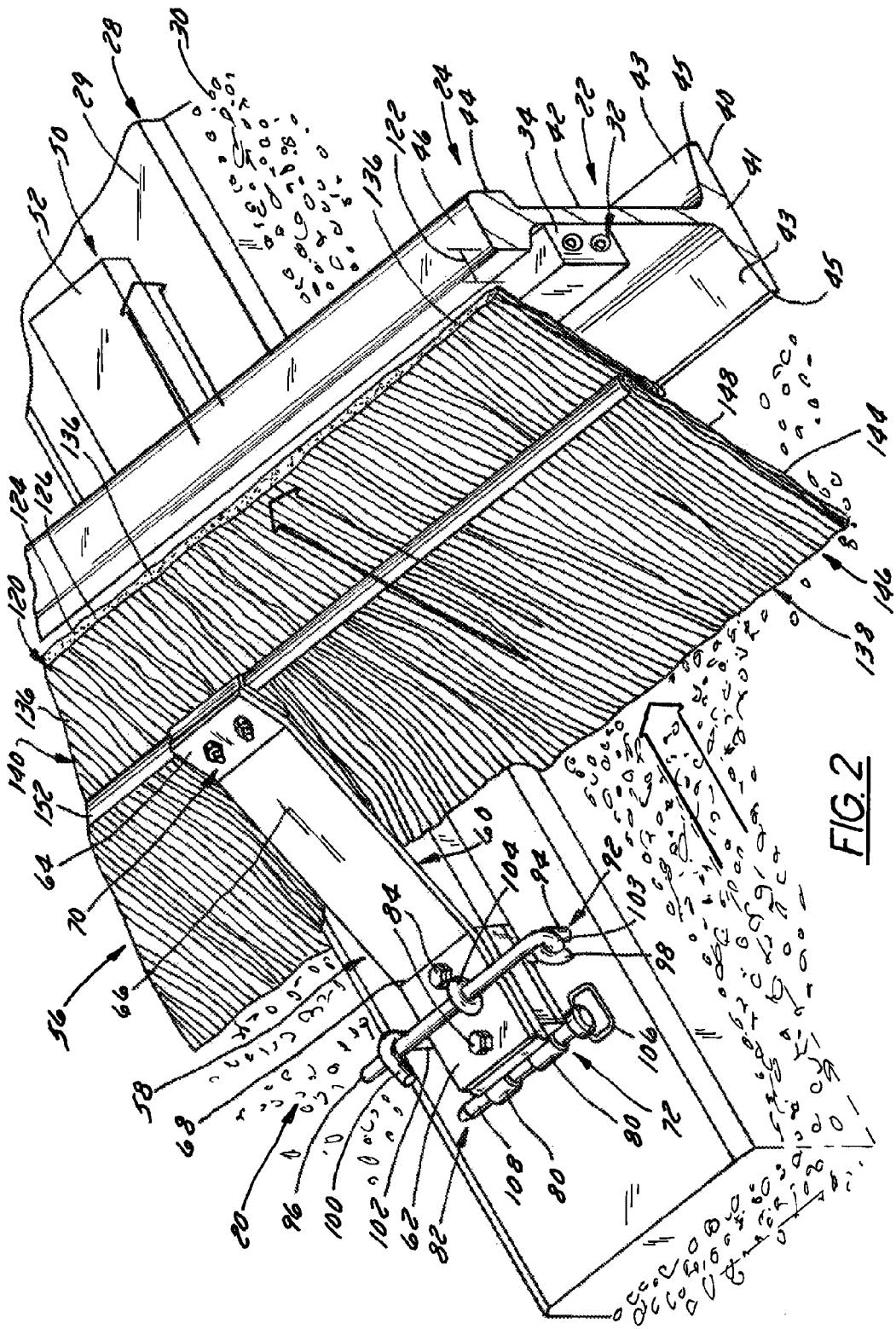
FIG. 2 is a fragmentary perspective view of a portion of a barrier of the barrier system of FIG. 1 disposed in an operating position where a weather barrier of the system is uprightly inclined toward a section of adjacent track rail.
Figure 3:
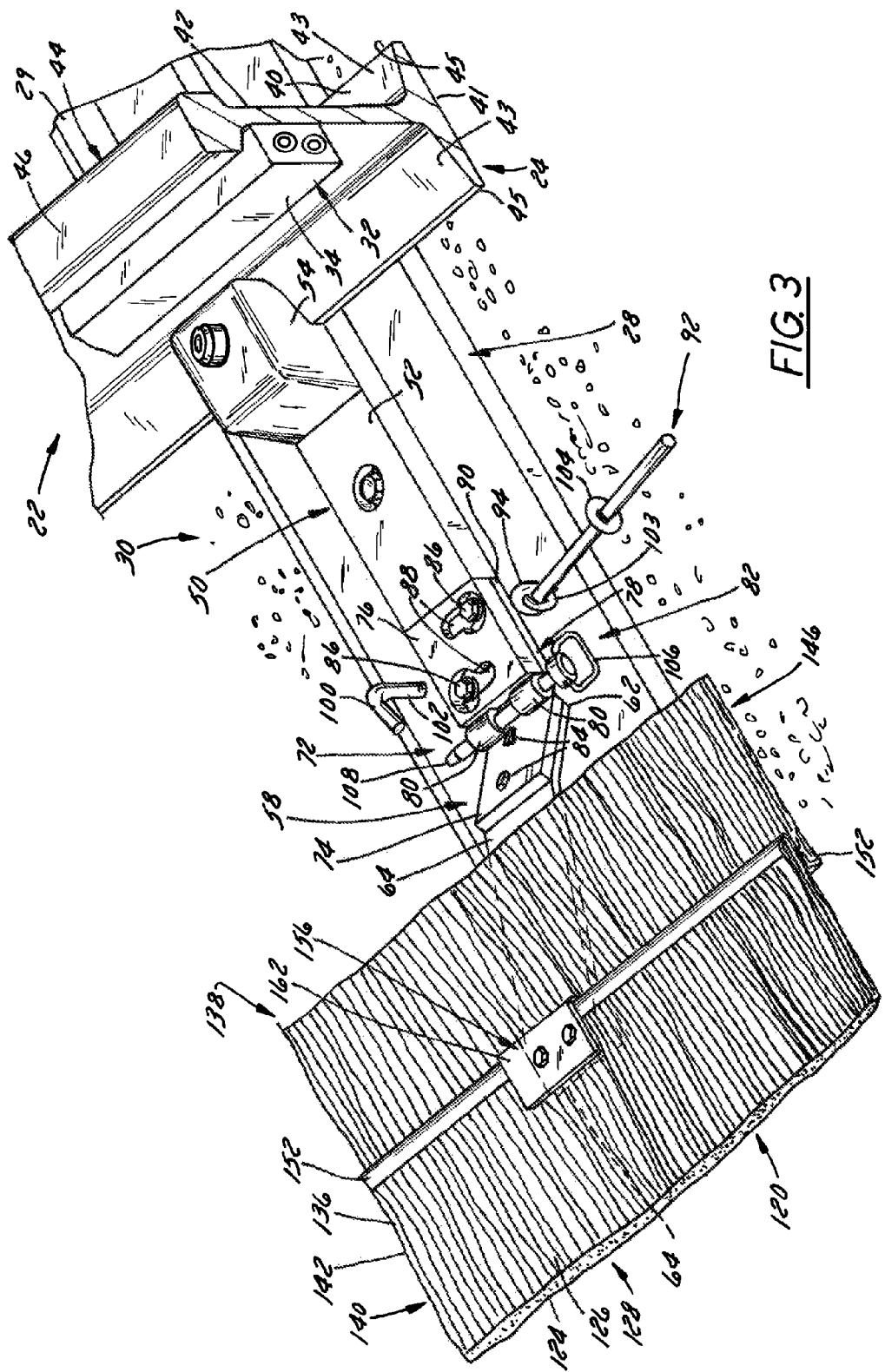
FIG. 3 fragmentary perspective view of a portion of the barrier system of FIG. 1 disposed in an inspection position where the barrier has been swung away from the adjacent rail permitting inspection and repair.
Figures 5, 6:
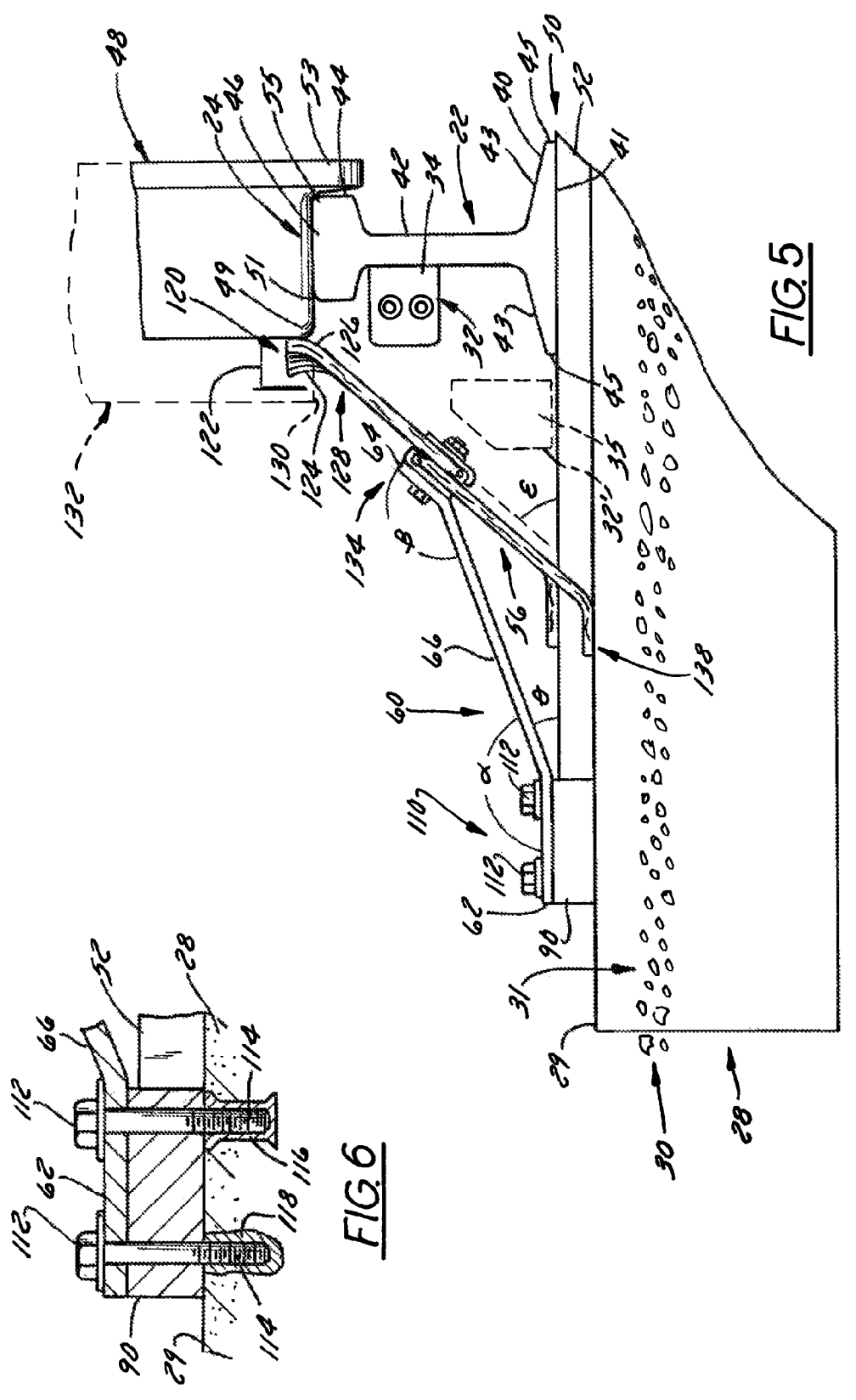

With additional reference to FIGS. 2, 3 and 5, railway track 22 is formed of a pair of spaced apart and generally parallel elongate fixed rails 24 that can be generally straight to define a straight section of track or curved as desired so as to form a curved section of track. Although not shown in the drawings, each rail 24 is formed of discrete rail segments arranged end-to-end and connected together by an overlapping fish plate that is bolted to each rail segment adjacent the segment end as is conventionally known. Of course, other arrangements can be employed to join together track segments.

As is best shown in FIGS. 1-3 and 5, each rail 24 has a generally I-shaped cross section with a relatively wide bottom base 40 interconnected by an upwardly extending vertical web 42 to a narrower rail head 44 that has an upper running surface 46 along which a flanged wheel 48 (FIG. 5) of a locomotive or railway vehicle rides during train operation. The wheel 48 has an outer bottom edge 49 that extends outwardly of an outer shoulder 51 of the rail head 44 and an inner downwardly extending flange 53 that extends downwardly alongside an inner shoulder 55 of the rail head 44.

Figure 4:
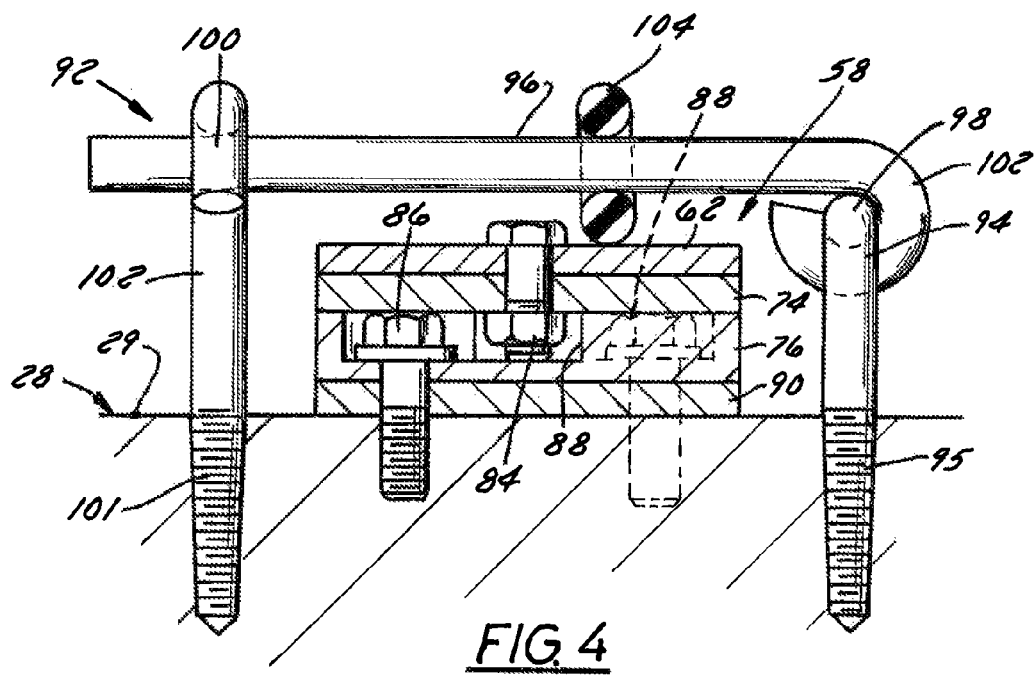
FIG. 4 is a transverse cross sectional view of a portion of a barrier mounting assembly and hinge assembly that includes a releasable latching arrangement that is latched to hold the barrier in its upright inclined operating position.

The rail base 40 has a flat bottom 41 overlying ties 28 and a pair of upper surfaces 43 each inclined from the web 42 downwardly to an outer edge 45 of the base 40 enabling the rail 24 to be anchored to railroad ties 28 by a tie plate or brace 50. Tie plates and braces 50 come in many widths, shapes and sizes represented by the exemplary brace 50 depicted in FIGS. 1 and 2 that includes a plate 52 underlying the rail base 40 that is fixed to tie 28 on each side of the rail 24 using one or more spikes or bolts with a lip or shoulder 54 (FIG. 3) on each side that engages the rail base 40 typically overlying part of the base 40. As depicted in FIGS. 1 and 4, one or more spikes, bolts or the like can extend along or through the shoulder 54 to facilitate rail base engagement. While the brace 50 is shown in the drawing figures as being narrower than a rail tie 28, it can be substantially the same width as the tie 28 or even wider than the tie 28 if desired.

The ties 28, also known as sleepers, are elongate generally rectangular planks of square or rectangular cross section that are typically made of wood, but can be made of concrete, steel or a composite material, such as recycled plastic, if desired. The ties 28 are laid on top of gravel, crushed stone, or rock that provides ballast and forms a railway bed 30 underlying the tracks 24 and ties 28 that typically is upraised. As is shown in FIGS. 1-3 and 5, the ties 28 are at least partially embedded in the gravel, crushed stone, or rock that forms the bed 30 with the exposed top surface of the bed 30 between ties 28 usually being no lower than a top surface 29 of each tie 28 typically forming shallow depressions 31 between the ties 28 that facilitate drainage.

Although only one movable switching rail 38 is shown in FIG. 1, the switch 36 can include a pair of switching rails 38 each of which is generally horizontally movable toward or away from one of the fixed rails 24 of track 22 depending upon the desired position of the switch 36. Although not shown, such a switch 36 can also include a frog where the rails 24 of the two tracks intersect as is conventionally known. During switching, each movable switching rail 38 of the switch 36 being activated is moved, such using an electric motor or other prime mover, from one position that allows a train or railway cars of the train to continue traveling along its existing track to another position where the switching rail 38 is located adjacent to or adjoins a fixed rail 24 of another track to which the train or cars of the train are being switched.

As is depicted in FIGS. 1-3 and 5, part of a switch clearing system 32 can be carried by a rail 24, such as by being mounted directly to the rail 24. For example, part of a rail heater 34, such as an electrical heating element, of switch clearing system 32 can be attached to the web 42 of the rail 24, such as with bolts, brackets, or the like, on one or both sides of the rail 24. During rail heater operation, heated fluid or electrical current flowing through the heating element of the heater 34 heats up the rail 24 in the vicinity of the switch 36 helping to melt snow and ice accumulation as well as keep snow and ice from accumulating. FIG. 5 illustrates another switch clearing system embodiment 32' in phantom that is representative of an elongate fluid, e.g., air, conveying and discharging duct 35 that extends alongside at least part of the rail 24 of the switch 36 or in the vicinity of the switch 36 generally parallel to the rail 24. Such a switch clearing system 32' can direct air toward the rail 24 or elsewhere in the vicinity of the switch 36 to keep accumulation away. The air can be heated to help melt snow and ice as well as prevent snow and ice from accumulating. Although a duct 35 is schematically depicted in FIG. 5, it can be a heating element, such as an infrared heating element, electrical heating element, or another type of rail heater.

Each barrier system 20 provides an upraised barrier 56 that is inclined toward a corresponding adjacent section of rail 24 deflecting precipitation and wind away from the rail 24 as well as away from at least that portion 34 of switch clearing system 32 or 32' located between the barrier system 20 and rail 24. This not only helps the switch clearing system 32 or 32' perform better; it also helps keep snow and ice from accumulating in a manner that can interfere with switch operation.

Each barrier system 20 extends generally parallel to a longitudinal direction of one of the rails 24 a predetermined distance alongside a corresponding adjacent rail 24 encompassing a straight or curved section of the rail 24 overlying at least a plurality of ties 28. As is shown in FIG. 1, a barrier system 20 can be disposed along sections of both rails 24 of a segment of track 22 that forms part of a switch 36 or is disposed adjacent a switch 36. If desired, barrier systems 20 can be staggered along opposite sides of the track 22 and located as desired in the vicinity of switch 36. If desired, one or both rails 24 can have a barrier system 20 on both sides.

The barrier 56 is attached to a plurality of mounting assemblies 58 spaced apart along the track 22 anchoring the barrier 56 uprightly and inclined toward an adjacent track rail 24 at a desired spacing relative to the rail 24. Each mounting assembly 58 is disposed over part of the railway bed 30 such that each mounting assembly 58 is disposed outwardly of the barrier 56 to which it is attached and outwardly of the rail 24 adjacent the barrier 56.

Mounting assembly 58 includes a mounting bracket 60 extending upwardly toward the adjacent rail 24 at an oblique angle relative to the ties 28 and railway bed 30. As best shown in FIG. 2, the mounting bracket 60 has a foot 62 at its bottom end that is anchored to one of the ties 28, a barrier mount 64 at its outer end to which the barrier 56 is attached, and a support arm 66 extending between the foot 62 and barrier mount 64 that is inclined at an acute angle toward the adjacent rail 24 and relative to the tie 28 which the bracket 60 overlies.

The generally horizontally extending foot 62 is oriented at an oblique angle relative to the support arm 66 and the support arm 66 is oriented at an oblique angle relative to the barrier mount 64. The bracket 60 is of one-piece, unitary and substantially homogenous construction made of a single piece of material, such as metal, plastic, composite, or the like, which is formed with a first bend 68 between the foot 62 and arm 66 and a second bend 70 between the arm 66 and mount 64. In the preferred embodiment of the bracket 60 shown in the drawings, the foot 62 and mount 64 are generally rectangular, e.g., square, and can be elongate, and the arm 66 is elongate and generally rectangular. As is shown in the drawing figures, the bracket 60 has a width no greater than that of the tie 28 the bracket 60 overlies and extends in a direction generally parallel to the tie 28.

To permit inspection of the adjacent rail 24 as well the portion of the switch clearing system 32 disposed between the barrier 56 and adjacent rail 24, each mounting assembly 58 can be pivotally mounted to the underlying tie 28 by a hinge assembly 72, such as depicted in FIGS. 1-4. Such a hinge assembly 72 enables the barrier 56 to be releasably retained in its upright operating position, such as the operating position shown in FIGS. 1 and 2, as well as to be pivoted away from the rail 24 to an inspection position disposed from the operating position, such as the inspection position depicted in FIG. 3, enabling the rail 24 and switch clearing system 32 disposed adjacent the rail 24 to be visually inspected.

With regard to the hinge assembly 72 depicted in FIGS. 1-4, the hinge assembly 72 of each one of the mounting assemblies 58 attached to a common section of barrier 56 is unlatched and rotated away from rail 24 to an inspection position where the barrier 56 is laid on part of the railway bed 30 adjacent ends of the ties 28. When pivoted to an inspection position, such as the inspection position shown in FIG. 3, the switch clearing system 32 and rail 24 are no longer covered by the barrier 56 enabling them to be visually viewed and accessed. This also enables or otherwise facilitates repair and/or replacement of the rail 24 and/or switch clearing system 32. When done, the section of barrier 56 along with the bracket 60 of each mounting assembly 58 attached to the barrier 56 are pivoted substantially in unison back to its upright inclined operating position, such as shown in FIGS. 1 and 2, and latched in the operating position.

The hinge assembly 72 of each mounting assembly 58 includes a pivotable hinge plate 74 pivotably attached to an anchor plate 76 by a hinge 78 having a plurality of hinge knuckles 80 through which a hinge pin 82 is received. The hinge plate 74 is fixed to the mounting bracket 60, such as by a plurality of fasteners 84 that securely attach the plate 76 to the foot 62 of the bracket 60. If desired, the hinge plate 74 and foot 62 can be of unitary construction, such as by being formed of a common plate that can be an integral portion of bracket 60 or the like.

The anchor plate 76 is fixed to the underlying tie 28 by a plurality of fasteners 86 that each can be a lag screw, a cap screw or bolt received in a screw or bolt anchor, or adhesively anchored such as by using an epoxy adhesive or the like. With specific reference to FIGS. 3 and 4, the anchor plate 76 has a pair of fastener accommodating recesses 88, e.g., in which part of a respective hinge plate fastener 84, such as the fastener head, stem and/or nut, is received when the hinge plate 74 is overlapped over the anchor plate 76 when the barrier 56 is disposed in the operating position. For example, each fastener seating recess 88 can extend outwardly from and/or be part of a counterbore or like recess in which each one of the anchor plate fasteners 86 is received. As shown in FIGS. 1-3, the anchor plate 76 can be located adjacent one end of the tie plate or brace 50 of the underlying tie 28 such that the plate 76 abuts the brace 50 which serves as a locator that advantageously provides a desired and uniform spacing for mounting the barrier 56 so the barrier 56 is substantially uniformly spaced relative to the adjacent rail 24 at substantially all points along the rail 24 where the barrier 56 extends.

A mounting pad 90 can be disposed between the anchor plate 76 and underlying tie 28 to provide a spacer that helps facilitate attachment of the anchor plate 76 to the tie 28. In a preferred embodiment, the pad 90 is of resilient construction and can be composed of a non-metallic material, such as a plastic, which helps space the anchor plate 76 above the tie 28 a desired amount. Where disposed adjacent or in abutment with an end of a tie plate or brace 50, the pad 90 also serves as a spacer to space the foot 62 of the mounting bracket 60 so it is substantially flush or above the top surface of the brace 50. Where disposed in abutment with the end of the brace 50, the pad 90 also helps facilitate desired and uniform location or spacing of the barrier 56 relative to the rail head 44.

Such a pad 90 can be configured to provide a spacer that is resilient and which conforms to uneven or rough top tie surfaces 29 helping provide more secure and stable mounting. In one preferred embodiment, the pad 90 is also of vibration damping or isolating construction that helps dampen wind and train wash induced vibration and oscillations of the barrier 56 during use and operation. In one preferred embodiment, the pad 90 is a plastic of elastomeric composition that not only helps the pad 90 to conform to rough or uneven tie mounting surfaces while serving as a spacer, but which also dampens and isolates barrier vibration and oscillation. Examples of suitable pad materials include nylon, polypropylene, polyvinyl chloride (PVC), polycarbonate, or even natural rubber in at least some instances.

With continued reference to FIGS. 1-4, a latch assembly 92 is used to releasably retain the barrier 56 in the operating position by keeping the hinge plate 74 in an overlapping relationship with the anchor plate 76 (and the foot 62). As best shown in FIGS. 2-4, the latch assembly 92 includes an eye bolt 94 with a latch arm 96 having one end attached to an eye 98 of the bolt 94 and having another end that releasably engages a hook retainer 100 of a J-shaped hook 102. In a preferred embodiment, the eye bolt 94 has lag threads 95 that allow it to be threaded into the tie 28 on one side of the hinge assembly 72 in the manner shown in FIG. 4 but can be anchored to the tie 28 in another manner, such as by using a different anchoring arrangement including one that adhesively anchors the bolt 94 to the tie 28. In a preferred embodiment, the hook 100 also has lag threads 101 that allow it to be threaded into the tie 28 on the other side of the hinge assembly 72 in the manner shown in FIG. 4 but also can be anchored to the tie 28 in another manner.

The latch arm 96 is elongate and has a connector 103 at one end that can be formed as an eye that movably interconnects with the eye 98 of the eye bolt 94 in a manner that enables the arm 96 to be moved, e.g., pivoted or swung, between an unlatched position, such as the unlatched position shown in FIG. 3, where the arm 96 is disengaged from the hook 102, and a latched position, such as the latched position shown in FIG. 4, where the arm 96 is engaged with the hook 102. When latched, the arm 96 transversely overlies the hinge plate 74 clamping the hinge plate 74 in place over the anchor plate 76 thereby keeping the barrier 56 disposed in its desired upright and inclined operating position. Where the barrier mounting bracket foot 62 is a component separate from the hinge plate 74, the arm 96 bears against the foot 62 and overlies the hinge plate 74 when latched clamping the foot 62 and hinge plate 74 against the anchor plate 76. When latched, the arm 96 extends generally transversely relative to the tie 28 and generally parallel to the barrier 56 and the adjacent rail 24. When latched, the arm 96 is disposed closer to the bend 68 between the foot 62 and mounting bracket arm 66 than to the hinge knuckles 80 providing a moment arm that helps keep the barrier 56 in the operating position by keeping the mounting bracket foot 62 and the hinge plate 74 overlapped with the anchor plate 76.

To help dampen vibration and provide isolation, the latch arm 96 carries a dampener 104 of vibration damping construction that can be made of an elastomeric material, such as one that is flexible, durable and resilient. In one preferred embodiment, the dampener 104 is an elastomeric donut or O-ring is rolled or otherwise telescopically inserted onto the latch arm 96. The dampener 104 is positioned on the arm 96 so the dampener 104 abuts directly against the foot 62 of the mounting bracket 60 when the arm 96 is latched providing some "give" while helping to hold the foot 62 and hinge plate 74 in place thereby holding the barrier 56 in the desired upright operating position where it is adjacent to and inclined toward rail 24. While the dampener 104 is depicted in FIG. 4 as a single O-ring of elastomeric construction, a plurality of such O-rings can be used. If desired, a dampener 104 that is elongate tubular sleeve of elastomeric construction can also be used. Suitable elastomeric materials for the dampener 104 include EPDM, nitrile, neoprene and the like.

Such a releasable latching hinge construction advantageously enables a barrier 56 constructed in accordance with the present invention to be quickly and easily swung away from the rail 24 to provide access to that part of the rail 24 along with any portion of the switch clearing system 32 ordinarily covered by the barrier 56 when disposed in its operating position. When latched in the operating position, the vibration damping and isolation provided by the dampener 104 carried by the latch arm 96 and/or the mounting pad 90 advantageously helps dampen vibration and absorb variations in forces the barrier 56 can encounter from wind blowing at different speeds, e.g., gusting, against the barrier 56 as well as varying force portions of the barrier 56 can encounter from the wash, e.g. air flow that can be turbulent, created when a train passes by the barrier 56.

To enable removal of a section of barrier 56 attached to a plurality of mounting assemblies 58, the hinge pin 82 of the hinge assembly 72 of each one of the plurality of mounting assemblies 58 can be configured to be removable in the manner depicted in FIGS. 1-4. The hinge pin 82 includes a handle 106 disposed at one end of a generally cylindrical pin portion 108, e.g., rod, with the handle 106 manually grasped to pull the pin portion 108 free of the hinge knuckles 80. In one preferred embodiment, the hinge pin 82 is a hitch pin or linch pin, which includes a handle that can be a quick release handle or the like at one end. Such a pin 82 can further be of locking or self-locking construction and can include a lanyard or the like (not shown) carrying a cotter pin or the like used to secure the end of the pin 82 opposite the handle 106 to prevent pin removal.

Removal disengages the hinge plate 74 from the anchor plate 76 allowing the section of barrier 56 and each mounting bracket 60 attached to the barrier 56 to be removed as a unit, such as for storage, maintenance, replacement, or the like. After removal of the pin 82 from the hinge 78 of each hinge assembly 72 of the mounting assemblies 58 attached to the section of barrier 56 sought to be removed, the barrier 56 is grasped and pulled free of the mounting assemblies 58 enabling the barrier 56 to be completely removed from the railway bed 30 if that is desired. With reference to FIG. 3, when removed, the anchor plates 76 remain attached to the tie 28, which are relatively flat such that a relatively obstruction free tie surface remains. Where each anchor plate 76 abuts a tie plate or brace 50 of the underlying tie 28, the anchor plate 76 can be mounted so it is substantially flush with the tie plate or brace 50 further helping to provide a relatively obstruction free outer tie surface.

FIGS. 5 and 6 illustrates a preferred embodiment of a mounting arrangement 110 that is similar to the mounting assembly 58 shown in FIGS. 1-4 but which directly fixes the mounting bracket 60 to the underlying tie 28 using a plurality of fasteners 112 that extend through the foot 62 of the bracket 60, through the mounting pad 90, and into the tie 28. As is best shown in FIG. 6, one or both fasteners 112 can be a bolt, cap screw or the like that has a threaded stem or shank 114 threadably received in a bolt or screw anchor 116 fixed within a bore within the tie 28. Such a fixing arrangement can be used where the tie 28 is made of a material other than wood, such as concrete, a composite material, or another type of material. Anchor 116 can be adhesively fixed, such as by using an adhesive like an epoxy, or can be fixed in another manner. If desired, the stem or shank 114 of each bolt or screw 112 can be directly adhesively fixed to the tie 28 using a layer of adhesive 118, such as an epoxy or the like, which is received in the bore in the tie 28 where a bolt or screw anchor is not used. Of course, where the tie 28 is made of wood, fasteners 112 can be lag bolts or the like that directly thread into the wood.

As with the mounting assembly 58 of FIGS. 1-4, the bracket 60 includes a plurality of bends or angles 68 and 70, respectively represented by $\alpha$ and $\beta$ in FIG. 5, that are obtuse included angles that orient the bracket arm 66 at an acute angle, $\theta$, relative to the top surface 29 of the tie 28 so as to incline the arm 66 toward the adjacent rail 24 in a manner that positions the barrier 56 adjacent the rail 24 without interfering with any part of the barrier 56 or obstructing with placement of any part of the switch clearing system 32 that is located between the barrier 56 and rail 24. In other words, the acute angle of the bracket arm 66 allows the mounting hardware used to mount the barrier 56 to be positioned out of the way of the barrier 56, any portion of switch clearing system 32 disposed between the barrier 56 and rail 24, as well as the adjacent rail 24. In addition, by acutely angling the bracket arm 66 at acute angle, $\theta$, typically ranging from between 5° and 45°, and preferably between about 15° and about 20°, it positions the arm 66 to better absorb and transmit forces acting against the barrier 56 where mounted to the tie 28, including forces created by the wash alongside the rail 24 created by a train traveling along the rails 24 of the track 22 at relatively high speeds that act on the barrier 56.

The length of the bracket arm 66 along with the respective angles, $\alpha$ and $\beta$, of the bends 68 and 70 of the bracket 60 are selected to position the barrier 56 a desired distance away from the rail 24 as well as any portion of a switch clearing system 32 disposed between the barrier 56 and the rail 24. The length of the bracket arm 66 along with the respective angles, $\alpha$ and $\beta$, of the bends 68 and 70 of the bracket 60 are selected to position the barrier 56 at a desired acute angle, $\epsilon$, relative to the underlying tie 28 so at least part of the barrier 56 is inclined toward the rail 24 so it overlies a portion of the rail base 40 disposed adjacent the barrier 56 to better shield any portion of the switching clearing system 32 or 32' disposed between the barrier 56 and rail 24.

The barrier 56 is configured to deflect wind and precipitation, including snow and rain, away from an adjacent rail 24 as well as any portion of a switch clearing system 32 or 32' disposed between the barrier 56 and the rail 24. The barrier 56 is inclined at an angle toward the rail 24 and positioned adjacent the rail 24 such that an upper edge 120 of the barrier 56 is disposed adjacent the head 44 of the rail 24 within a wash zone 122 located between an outer edge 49 of a wheel 48 of a train traveling along rails 24 of the track 22 in which air is churned up, typically turbulently, when the train passes through. Such a wash zone 122 typically extends from the outer edge 49 of the wheel 48 to a location about an inch and a half (about 38 mm) away from the wheel edge 49 and can extend alongside as well as below the head 44 of the rail 24 adjacent the barrier 56. Such a wash zone 122 will vary in extent or width in a transverse direction relative to the rail 24 depending on the speed of the train, the outer contour of wheel rail cars or vehicles of the train, as well as the nature and type of cargo carried by the rail cars or vehicles.

The upper edge 120 of the barrier 56 is made of a plurality of wind deflecting elements 124 and 126 that are movable relative to one another such as in the manner depicted in FIG. 5 in response to wash created in the wash zone 122 from a train passing by. As a result of the wind deflecting elements 124 along the upper edge 120 of the barrier 56 located closest to the rail head 44, the deflecting element 124 can move relative to another deflecting element 126 to accommodate rapid and unpredictable changes in air pressure in air along, inside and outside of the barrier 56 thereby permitting the upper edge 120 of the barrier 56 to be positioned much closer to the rail head 44 and the wheels 48 of a train passing by than with conventional barrier systems of solid construction used in the past. This is because the rapid fluctuations in air pressure created in the wash zone, as well as the large magnitude of the changes in air pressure would dislodge or damage conventional solid barrier systems in the past rendering them ineffective or dramatically reducing their effectiveness.

The deflecting elements 124 and 126 preferably are flexible at least along the upper edge 120 of the barrier 56 to facilitate movement relative to each other and relative to any part of railway vehicle wheel 48 and/or tire 132 of any high-rail vehicle or roadrailer the deflecting elements 124 contacts minimizing contact with them. This enables the upper edge 120 of the barrier 56 to be spaced closer to the adjacent rail 24 which deflects more precipitation away from between the barrier 56 and adjacent rail 24 as well as better vertically shields any portion of the switch clearing system 32 or 32' disposed between the barrier 56 and rail 24 by reducing the gap between the barrier 56 and rail 24.

In a preferred embodiment, a plurality of pairs, i.e., at least three, wind deflecting elements, e.g., three or more wind deflecting elements 124 and 126, are movable relative to one another, including generally transversely relative to the longitudinal direction of the upper edge 120 and generally transversely relative to a longitudinal direction of the barrier 56, and form a wind deflector 128 that is inclined at an acute angle, $\epsilon$, relative to an adjacent underlying tie 28 (as well as an adjacent underlying part of the railway bed 30) toward the rail 24 forming at least an upper portion of the barrier 56. The wind deflecting elements 124 and 126 form a generally planar wind deflector 128 when the barrier is not being subjected to any wind or wash created during train passage.

In the preferred barrier embodiment shown in FIG. 5, the upper edge 120 of the barrier 56 is positioned within the wash zone 122 having wind deflecting elements 124 and 126 disposed adjacent a bottom edge 49 of wheels 48 of the locomotive and wheeled rail cars or vehicles of the train traveling along the rails 24 of the track 22 such that portions of the upper barrier edge 120 can even come into contact with one or more wheels 48 as depicted in FIG. 5. The upper edge 120 of the barrier 56 is positioned so it is disposed alongside the head 44 of the adjacent rail 24 at a height above a bottom surface 130 of a tire 132 (shown in phantom in FIG. 5) of a high-rail maintenance truck riding on the rails 24 or a plurality of semi-trailers connected together in a "roadrailer" configuration such that the barrier edge 120 can come into contact with the tire bottom surface 130 as further depicted in FIG. 5 without the tire 132 dislodging or damaging the barrier 56. Although a single tire 132 is shown in phantom in FIG. 5, a high-rail maintenance truck and trailers connected in a "roadrailer" configuration can have a second tire (not shown) disposed farther outboard of tire 132 that can also dislodge or damage barrier systems of conventional construction when they come into contact with the conventional barrier system or when subjected to wash created by the tires during train passage. By inclining the barrier 56 at an acute angle, the barrier 56 of a barrier system 20 constructed in accordance with the present invention advantageously avoids any contact whatsoever with such an outboard tire.

In another preferred embodiment, such as depicted in FIG. 2, the inclined barrier 56 is spaced relative to the rail 24 so its upper edge 120 is located within the wash zone 122 above a bottom edge or corner of the rail head 44 adjacent the web 42 but below of the bottom of a railway vehicle wheel 48 (FIG. 5) riding on the rail 24 shown in FIG. 2 so it is close to the wheel 48 but not in direct contact with the wheel 48. With continued reference to FIG. 2, upper edge 120 of the barrier 56 also is disposed below a bottom of a tire 132 (FIG. 5) of a high-rail vehicle or roadrailer riding on the rail 24 shown in FIG. 2. In such a preferred embodiment, the upper edge 120 of the barrier 56 lies below the running surface 46 of the rail head 44 alongside of the rail head 44 in the wash zone 122.

The barrier 56 of a barrier system 20 constructed in accordance with the present invention better shields the railway track 22 of adjacent and along a switch 36 because the upper edge 120 of the barrier 56 is located closer to the head 44 of the rail 24 than with conventional solid barrier systems used in the past. As a result, the barrier 56 can be positioned as depicted in FIG. 5 so close to the rail 24 that its upper edge 120 vertically overlies part of the base 40 of the rail 24 and can vertically overlie part of a switch clearing system 32 or 32', such as duct 35, keeping precipitation, including snow and rain out, while also reducing heat loss by acting as a thermal barrier including by providing thermal insulation. As also shown in FIG. 5, as a result of at least the wind deflector 128 formed at least in part by wind deflecting elements 124 and 126 being inclined at acute angle, $\epsilon$, as discussed above, toward the rail 24 at least a portion of the wind deflector 128 disposed inwardly of the upper barrier edge 120 can overlie part, e.g., duct 35 (or a heating element), of a switch clearing system 32' substantially completely enclosing that part of the switch clearing system 32' by the barrier 56 forming an enclosure 134 with the rail 24.

In the preferred barrier embodiment shown in FIGS. 1-5, the plurality of pairs of relatively movable wind deflecting elements 124 and 126 are formed by filaments 136 that form a brush 140 carried by the barrier mount 64 with the filaments defining outwardly extending flexible brush bristles 142. Brush 140 forms the wind deflector 128 that is acutely angled at angle, $\epsilon$, as discussed above and which can vertically overlie all or a portion of switch clearing system 32 or 32' as previously described. As a result of being acutely angled and inclined toward the rail, wind deflector 128 deflects wind blowing toward the deflector 128 across the rails 24 of the track 22 upwardly thereby carrying upwardly any precipitation in the air so it is not deposited between the barrier 56 and adjacent rail 24. Where there is no wind or when the wind blows generally along the rails 24 of the track 22 generally parallel to the rails 24, inclining the barrier 56 acutely so it overlies part of the rail base 40 and partially encloses part of the switch clearing system 32 or 32' between the barrier 56 and adjacent rail 24 helps keep precipitation from accumulating in between the barrier 56 and rail 24. Acutely inclining at least the wind deflector 128 in this manner results in the wind deflector 128 directing precipitation falling in low wind conditions to fall onto the deflector 128 and either slide or flow down the exterior of the deflector 128 away from any portion of the switch clearing system 32 or 32' disposed between the barrier 56 and adjacent rail 24.

In the preferred barrier embodiment shown in FIGS. 1-5, the barrier 56 includes a downwardly extending skirt 138 that resiliently conforms to the contour of the ties 28 and railway bed 30, including any depressions 31 in the bed 30 in between the ties 28, along the bottom of the barrier 56. This construction not only keeps wind out from the space between the barrier 56 and adjacent rail 24, it also helps provide a thermal barrier or seal along the barrier bottom that increases switch clearing system effectiveness. In the preferred embodiment shown in FIGS. 1-5, the skirt 138 can be inclined at the same acute angle, $\epsilon$, as the wind deflector 128 but can have an orientation that differs from the angle of inclination of the wind deflector 128. For example, the skirt 138 can extend generally downwardly so as to be generally perpendicular to an underlying tie 28 if desired or can be inclined toward the adjacent rail 24 at an angle of inclination that differs from angle, $\epsilon$.

In a preferred embodiment the skirt 138 or a portion of the skirt 138 is formed of a plurality of filaments 144 that in turn form a brush 146 having a plurality of pairs, i.e., at least three, generally downwardly extending flexible brush bristles 148. As with the upwardly extending brush 140 that forms the wind deflector 128, the downwardly extending brush 146 can be carried by barrier mount 64, such as in the manner shown in FIG. 7.

Figure 7:
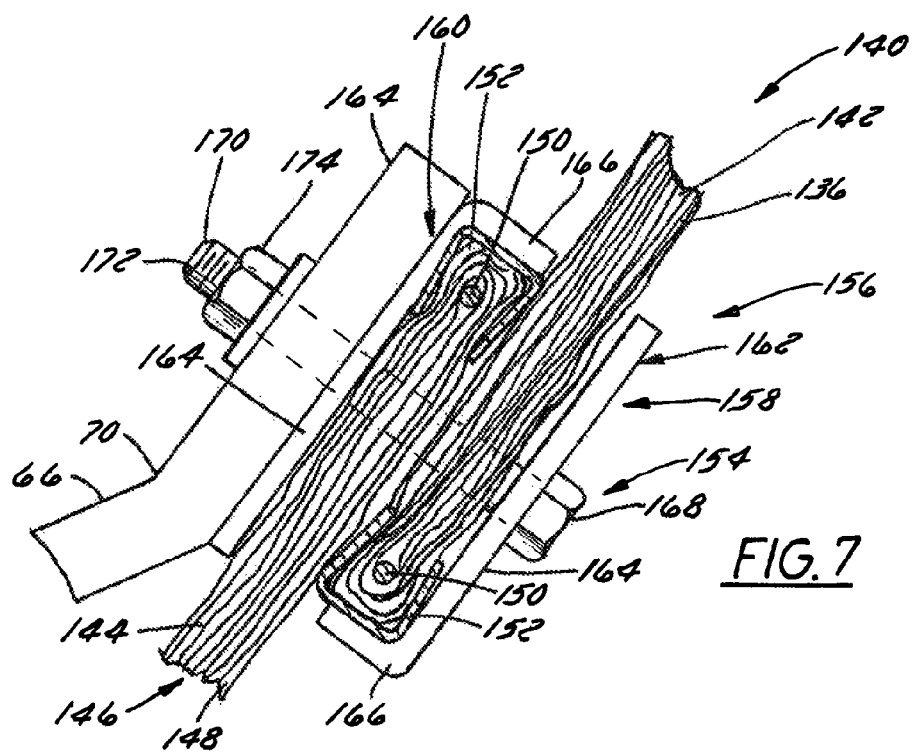
FIG. 7 is a fragmentary cross-sectional view of a barrier holder used to removably hold a pair of oppositely extending brushes that form a brush strip.

In the preferred embodiment of the barrier 56 shown in FIGS. 1-3 and 5, the barrier 56 is formed by a pair of oppositely extending brushes 140 and 146 that can be generally parallel to one another and can overlap a portion of one another as depicted in FIG. 7. The brushes 140 and 146 can be constructed in accordance with the brushes disclosed in WO/2005/103384, the entire disclosure of which is hereby expressly incorporated by reference herein.

With reference to FIG. 7, since the upper brush 140 and lower brush 146 can be similarly constructed, an exemplary construction of only one of the brushes 140 is discussed herein in more detail. Brush 140 has a plurality of pairs of flexible filaments 136 that can be wrapped around a core rod 150 (shown in phantom) and held in place by a generally U-shaped spine or clip 152 defining brush bristles 142 that extend outwardly from the core rod 150. In a preferred embodiment, the spine 152 is of non-metallic construction and lacks a core rod to thereby limit and preferably prevent transmission of electricity, e.g., static electricity, along the barrier 56. In such a preferred non-metallic brush construction, the spine 152 can be extruded of non-metallic material, such as plastic, without any core rod, with the filaments 136 also being of non-metallic construction.

In a currently preferred embodiment, the filaments 136 of the upper brush 140 are made of polyester and the filaments 136 of the lower brush 146 are made of polypropylene as these materials provides brushes 140 and 146 that are durable, resilient and of water repellent construction that keeps precipitation out from between the barrier 56 and the adjacent rail 24. Polyester is preferred for the filaments 136 or bristles 148 of the upper brush 140 because it is more durable and more resistant to wear, including from wheel or tire contact, and weathering, including from wind and wash. If desired, the filaments 136 or bristles 148 of both brushes 140 and 146 can be made of polypropylene. In addition to these filament or bristle materials advantageously repelling water, i.e., constructed of water repellant material, preventing it from getting between the brushes 140 and 146 and the rail 24, they produce a barrier 56 disposed close enough to the rail 24 to advantageously provide thermal insulation to reduce the rate of heat loss of heat emanating from heating element 34 of switch clearing system 32 or duct 35 of switch clearing system 32' increasing their operating effectiveness. In one preferred embodiment, each brush 140 and 146 is made of a plurality of pairs of layers of filaments 136 producing a plurality of pairs of layers of bristles 148 arranged to have a brush thickness of at least three-eighths of an inch (about 9.5 mm) producing a brush 140 and/or 146 having an R-value of at least 2 $ft^{2\circ}$ F. h/Btu per inch of brush thickness (or a U value of at least 0.3522 $m^{2\circ}$ K/W) such that each brush traps heat from rail heaters, including electric heating elements and/or heated forced air ducts mounted on either or both sides of the rail 24 reducing heat loss.

With continued reference to FIG. 7, the brushes 140 and 146 are removably attached to the mount 64 of the mounting bracket 60 in a manner that advantageously permits removal and replacement of one or both brushes 140 and 146. The mount 64 is attached by a plurality of fasteners 154 to a brush holder 156 formed of a clamping bracket assembly 158 that includes a pair of generally L-shaped clamp plates 160 and 162 that clamp the brushes 140 and 146 along their spines 152 so a portion of their bristles extending outwardly from their respective spines 152 overlap. Each L-shaped clamp plate 160 and 162 has a flat clamping segment 164 that is generally parallel to mount 64 and overlaps part of a respective brush 140 and 146 against which it exerts a clamping force when the fasteners 154 are tightened. Each clamp plate 160 and 162 further includes a brush abutment 166 generally perpendicular to the corresponding clamping segment 160 and 162 against which the spine 152 of a respective one of the brushes 140 and 146 abuts.

Each fastener 154 is a bolt that has a head 168 that engages one of the mount 64 or the clamping segment 164 of the outer clamp plate 162 from which projects a shank or stem 170 that extends through filaments of both brushes 140 and 146 adjacent the corresponding spine 152 of each brush 140 and 146 outwardly of the other one of the mount 64 or clamping segment 164 of outer plate 162 with its threads 172 receiving a nut 174. When the fastener 154 is tightened, such as by tightening the bolt head 168 or nut 174, clamp plates 160 and 162 are urged together clamping the brushes 140 and 146 therebetween. Since the stem or shank 170 of each fastener 154 extends through the filaments between the spine 152 of each brush 140 and 146 and the spine abutment 166 of the respective clamp plate 160 and 162 against which the spine 152 abuts, the fasteners 154 prevent each brush 140 and 146 from being pulled free of the clamp plates 160 and 162 thereby securely attaching the brushes 140 and 146 to each other and to the mount 64 of the mounting bracket 60.

In use and operation, the upper brush 140 of the barrier 20 is inclined at an oblique angle relative to underlying tie 28 toward the rail head 168 of the adjacent rail 24 that preferably is an acute angle when the barrier 20 is disposed in its operating position. The upper edge 120 of the brush 140 defined by tips or ends of a plurality of bristles 142 of the brush 140 that are flexible so as to be movable relative to one another is located next to the adjacent rail head 168 in the wash zone extending alongside the rail head 168. The tips of the brush bristles 142 defining the upper edge 120 extend to a height that extends higher than a bottom edge 49 of the rail head 168 and can extend to a height higher than the running surface 46 of the rail head 168 as shown in FIG. 5. Inclining the upper brush 140 at such an acute angle toward the rail head 168 with its upper edge 120 formed by tips of its bristles 142 enables the upper brush 140 to act as a deflector that deflects wind and any precipitation carried by the wind over the rail head 168 helping to prevent precipitation from accumulating between the barrier 20 and the adjacent rail 24.

The barrier 20 has a lower skirt that extends downwardly so it is in contact with portions of the underlying railway bed along with one or more ties supported by the bed 30 that helps keep wind and precipitation impinging against the skirt from getting in between the barrier 20 and adjacent rail 24. In a preferred embodiment, the skirt is formed of a lower brush 146 having flexible bristles 142 movable relative to one another with bristle tips defining a bottom edge that is in contact with the railway bed 30 and one or more ties 28 supported by the bed 30 with the bristles 142 having a length enabling conformance with the uneven surface created by ties 28 and portions of the bed 30 between the ties 28. While the lower brush 146 can be oriented at an angle different than the upper brush 140, it can also be obliquely angled at an acute angle relative to an underlying tie 28 that is about the same as the acute angle of inclination of the upper brush 140 such that the upper brush 140 and lower brush 146 extend generally in opposite directions that can be generally parallel or coincident.

The barrier 20 is mounted to a mounting assembly 58 that includes a mounting bracket 60 with a bracket arm 66 that can be anchored relative to the railway bed 30, such as by being mounted to an underlying tie 28 in the manner depicted in FIGS. 1-4 or FIGS. 5 and 6. In the preferred embodiment shown in FIGS. 1-4, the bracket 60 is mounted by a hinge assembly 72 that allows the bracket 60 and barrier 20 to be swung away from an operating position, such as shown in FIGS. 1 and 2, to a position disposed from the operating position, such as shown in FIG. 3, enabling rail access for inspection, repairs and the like. The hinge assembly 72 includes a latch 92 that is releasably latched when the barrier 20 is disposed in the operating position to keep the barrier 20 from being moved from the operating position. When the latch 92 is disengaged or unlatched and moved away from the hinge assembly 72, the barrier 20 can be swung away from its operating position to an inspection position.

When the barrier 20 is swung away from the adjacent rail 24, the handle 106 of the pin portion 108 can be grasped and the pin 108 pulled free of the hinge 78 enabling the barrier 20 to be removed while still attached to the mounting bracket 60. When it is desired to reinstall the barrier 20, the hinge plate 74 is placed adjacent the anchor plate 76 so the hinge pin can be inserted into the hinge knuckles 80 and the pin 82 is then inserted into the knuckles 80. The barrier 20 can then be swung about the hinge 78 to its operating position where the latch arm 96 is then engaged with the hook 102 latching the barrier 20 in the operating position in a manner that locks it in place in the operating position.

Precipitation, such as snow and rain, falling downwardly during periods of little wind falls onto the inclined upper brush 140 of the barrier 20 where it slides, rolls or flows downwardly away from the adjacent rail 24 thereby helping to minimize accumulation of precipitation between the barrier 20 and rail 24. Where precipitation is accompanied by wind, the inclined angle of the upper brush 140 directs the flow of wind and the precipitation carried by the wind up and over the head of the rail 24 helping to prevent precipitation from accumulating between the barrier 20 and rail 24. The lower brush 146 helps keep wind and precipitation along the ground, e.g., railway bed 30, from getting between the barrier 20 and rail 24. Where only the wind is blowing, the inclined angle of the upper brush 140 directs the wind away from any portion of a switch clearing system disposed between the barrier 20 and rail 24 thereby reducing heat loss advantageously increasing effectiveness of switch clearing system operation.

It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

It is claimed:

1. A barrier system for a railway track having a pair of spaced apart and generally parallel elongate rails of generally I-shaped cross-section with each track rail having a head on top and a base on the bottom, the barrier system comprising:
   an uprightly extending barrier extending alongside a section of an adjacent one of the track rails, the barrier comprised of a plurality of deflecting elements movable relative to one another defining a flexible deflector having an upper edge located adjacent and alongside the head of the adjacent one of the track rails inclined toward the head of the adjacent one of the track rails, the flexible deflector having a portion vertically overlying a portion of the base of the adjacent one of the track rails; and
   a mounting assembly that holds the barrier uprightly alongside the section of the adjacent one of the track rails.

2. The railway track barrier system of claim 1, wherein the flexible deflector is comprised of an elongate brush and wherein the plurality of deflecting elements comprise flexible bristles of the brush with ends of a plurality of the flexible bristles defining the upper edge of the flexible deflector.

3. The railway track barrier system of claim 1, wherein the upper edge of the flexible deflector is disposed at a height higher than a bottom of the head of the adjacent one of the track rails.

4. The railway track barrier system of claim 1, wherein the flexible deflector is inclined at an acute angle relative to an adjacent tie or sleeper underlying the adjacent one of the track rails toward the head of the adjacent one of the track rails and wherein the flexible deflector is elongate having a length such that the elongate flexible deflector overlies and extends generally transversely across a plurality of adjacent ties or sleepers.

5. The railway track barrier system of claim 1, wherein the upper edge of the flexible deflector vertically overlies the portion of the base of the adjacent one of the track rails.

6. The railway track barrier system of claim 1, wherein the upper edge of the flexible deflector is located next to an outer edge of an adjacent railway vehicle wheel traveling on the head of the adjacent one of the track rails.

7. The railway track barrier system of claim 1, further comprising a switch clearing system comprised of a rail heater or a fluid conveying duct disposed between the flexible deflector and the adjacent one of the track rails, and wherein a portion of the deflector overlies a portion of the switch clearing system.

8. The railway track barrier system of claim 1, wherein the mounting assembly comprises a hinge that enables the barrier to be pivoted about the hinge between (a) an operating position where the barrier is disposed uprightly alongside the adjacent one of the track rails, and (b) an inspection position where the barrier is spaced farther away from the adjacent one of the track rails than when the barrier is disposed in the operating position.

9. A barrier system for a railway track having a pair of spaced apart and generally parallel elongate rails each having a head on top and a base on the bottom, the barrier system comprising:

a weather protection barrier comprised of a flexible deflector having a plurality of flexible deflecting elements extending alongside a section of an adjacent one of the track rails, the flexible deflector comprises a brush and the plurality of deflecting elements comprises a plurality of brush bristles extending toward the head of the adjacent one of the track rails with ends of a plurality of brush bristles defining an upper edge of the flexible deflector located adjacent the head of the adjacent one of the track rails and vertically overlying a portion of the base of the adjacent one of the track rails; and a mounting assembly mounting the barrier alongside the section of the adjacent one of the track rails.

10. The railway track barrier system of claim 9, wherein the barrier further comprises a skirt that extends generally downwardly toward a bed of the railway.

11. The railway track barrier system of claim 10, wherein the skirt is flexible and substantially conforms to a plurality of spaced apart ties or sleepers underlying the adjacent one of the track rails and supported by the bed of the railway.

12. The railway track barrier system of claim 11, wherein the skirt comprises a second brush having a plurality of brush bristles extending downwardly in contact with the railway bed and in contact with the plurality of spaced apart ties or sleepers underlying the adjacent one of the track rails.

13. The railway track barrier system of claim 9, wherein the mounting assembly comprises a hinge configured to enable the barrier to be rotated between (a) an operating position where the barrier is disposed generally uprightly alongside the adjacent one of the track rails, and (b) an inspection position where the barrier is spaced farther away from the adjacent one of the track rails then when disposed in the operating position; and wherein the hinge is further configured to permit detachment and removal of the barrier.

14. The railway track barrier system of claim 9, wherein the mounting assembly comprises (a) a hinge, (b) a mounting bracket attached to the hinge that is comprised of a bracket arm carrying the barrier that is rotatable between (i) an operating position where the barrier is disposed alongside the adjacent one of the track rails, and (ii) a second position where the barrier is spaced farther away from the adjacent one of the track rails than when the barrier is disposed in the operating position, and (c) a latch that overlies a portion of the bracket arm when the bracket arm is disposed in the operating position releasably retaining the barrier in the operating position when latched, and that is unlatched when the latch clears the bracket arm allowing the bracket arm to be rotated about the hinge away from the operating position toward the second position.

15. The railway track barrier system of claim 9, wherein the mounting assembly comprises (a) a mounting bracket comprised of a bracket arm carrying the barrier that is movable between (i) an operating position positioning the barrier adjacent the adjacent one of the track rails, and (ii) a second position where the barrier is moved farther away from the adjacent one of the track rails than when the barrier is disposed in the operating position, (c) a latch that releasably engages a portion of the bracket arm when the bracket arm is disposed in the operation position releasably retaining the bracket arm in the operating position when the latch is latched, and (d) a dampener disposed between the latch and the bracket arm when the latch is latched.

16. The railway track barrier system of claim 9, wherein the mounting assembly comprises a hinge enabling the barrier to be moved relative to the adjacent one of the track rails, and wherein the hinge is comprised of a hinge pin having a handle that is pulled free of the hinge enabling detachment and removal of the barrier.

17. The railway track barrier system of claim 9, wherein the upper edge of the brush is disposed within a wash zone of flowing air created by railway vehicle wheels riding on the head of the adjacent one of the track rails that extends alongside the railway vehicle wheels riding on the head of the adjacent one of the track rails and alongside the head of the adjacent one of the track rails.

18. The railway track barrier system of claim 17, wherein the upper edge of the brush is disposed adjacent to and alongside the head of the adjacent one of the track rails.

19. The railway track barrier system of claim 9, wherein the upper edge of the brush is disposed adjacent to and alongside the head of the adjacent one of the track rails.

20. The railway track barrier system of claim 9, wherein the upper edge of the brush extends to a height higher than the head of the adjacent one of the track rails.

21. The railway track barrier system of claim 9, further comprising a switch clearing system disposed between the barrier and the adjacent one of the track rails, and wherein the upper edge of the brush overlies a portion of the switch clearing system.

22. A barrier system for a railway track having a pair of spaced apart and generally parallel elongate rails with each track rail having a head on top and a base on the bottom, the barrier system comprising:

an elongate generally upright barrier extending longitudinally alongside a section of an adjacent one of the track rails comprised of (a) an upper brush having a plurality of brush bristles extending generally upwardly at an oblique angle relative to the adjacent one of the track rails generally toward the head of the adjacent one of the track rails, the brush bristles having ends defining an upper edge of the barrier disposed alongside the adjacent one of the track rails that overlies a portion of the base of the adjacent one of the track rails, and (b) a lower brush having a plurality of brush bristles extending generally downwardly toward one of a railway bed and an adjacent tie or sleeper underlying the adjacent one of the track rails; and a mounting assembly mounting the barrier alongside the section of the adjacent one of the track rails.

23. The railway track barrier system of claim 22, wherein the mounting assembly comprises (a) a barrier mount that carries the barrier, and (b) a mounting bracket disposing the barrier between the adjacent one of the track rails and the mounting bracket with the mounting bracket comprising an elongate bracket arm carrying the barrier mount with the elongate bracket arm inclined at an acute angle relative to an underlying tie or sleeper generally upwardly toward the one of the adjacent track rails.

24. The railway track barrier system of claim 22, wherein the mounting assembly comprises (a) a mounting bracket having a bracket arm inclined generally upwardly from an underlying tie or sleeper toward the head of the adjacent one of the track rails, and (b) a spacer pad disposed between the mounting bracket and an underlying adjacent tie or sleeper spacing the mounting bracket relative to a tie plate or brace underlying the adjacent one of the track rails and overlying the adjacent tie or sleeper locating the mounting bracket relative to an end of the tie plate or brace locating the barrier relative to the head of the adjacent one of the track rails.

25. The railway track barrier system of claim 22, further comprising a brush holder carried by the mounting assembly, the brush holder having a plurality of generally L-shaped clamping plates releasably holding the upper and lower brushes with the brush bristles of the upper brush extending outwardly in a direction generally opposite the brush bristles of the lower brush.

26. A barrier system for a railway track having a pair of spaced apart and generally parallel elongate rails, the barrier system comprising:
  an uprightly extending weather protection barrier extending alongside an adjacent one of the track rails comprising a flexible deflector inclined at an oblique angle relative to the adjacent one of the track rails toward a head of the adjacent one of the track rails with the deflector comprised of a plurality of flexible deflecting elements movable relative to one another that terminate to form an upper edge of the deflector located alongside the adjacent rail head and vertically overlying a portion of a switch clearing system disposed between the barrier and the adjacent one of the rails; and
  a mounting assembly that holds the barrier uprightly alongside the section of the adjacent one of the track rails.

27. The railway track barrier system of claim 26, wherein the upper edge of the deflector vertically overlies a base of the adjacent one of the rails.

28. The railway track barrier system of claim 26, wherein the switch clearing system disposed between the barrier and the adjacent one of the rails comprises a rail heater attached to the adjacent one of the track rails.

29. The railway track barrier system of claim 26, wherein the upper edge of the deflector extends to a height higher than a running surface of the adjacent rail head.

30. The railway track barrier system of claim 29, wherein the upper edge of the deflector is located relative the adjacent rail head so the upper edge adjoins or contacts part of a railway vehicle wheel riding on the adjacent one of the track rails.

31. A barrier system for a railway track having a pair of spaced apart and generally parallel elongate rails with each track rail having a head on top and a base on the bottom, the barrier system comprising:
  an elongate barrier extending alongside an adjacent one of the track rails supported on a plurality of spaced apart ties or sleepers, the barrier comprising an elongate first brush having a plurality of generally upwardly extending bristles inclined at an oblique angle relative to the adjacent one of the track rails toward the head of the adjacent one of the track rails with the bristles having an upper edge located alongside the adjacent one of the track rails within a wash zone of flowing air created by railway vehicle wheels riding on the head of the adjacent one of the track rails extending alongside the railway vehicle wheels riding on the head of the adjacent one of the track rails and extending alongside the head of the adjacent one of the track rails with the upper edge of the bristles of the first brush adjoining or contacting part of one of the railway vehicle wheels riding on the head of the adjacent one of the track rails; and
  a mounting assembly holding the barrier generally uprightly alongside the adjacent one of the track rails.

32. The railway track barrier system of claim 31, wherein the barrier further comprises a downwardly extending skirt.

33. The railway track barrier system of claim 32, wherein the skirt comprises a second brush extending alongside the first brush, the second brush having a plurality of bristles extending generally oppositely away from the plurality of bristles of the first brush generally downwardly into contact with one of the railway bed and the plurality of spaced apart ties or sleepers.

34. The railway track barrier system of claim 31, wherein the upper edge of the first brush overlies the base of the adjacent one of the track rails.

35. The railway track barrier system of claim 31, further comprising a switch clearing system disposed between the barrier and the adjacent one of the track rails, and wherein the upper edge of the first brush overlies a portion of the switch clearing system.

36. The railway track barrier system of claim 31, wherein the upper edge of the first brush extends upwardly to a height higher than a bottom of the head of the adjacent one of the track rails.

37. The railway track barrier system of claim 31, wherein the upper edge of the first brush extends to a height higher than the head of the adjacent one of the track rails.

\* \* \* \* \*